US012478541B1

(12) United States Patent
Liu

(10) Patent No.: US 12,478,541 B1
(45) Date of Patent: Nov. 25, 2025

(54) ROTARY MASSAGE DEVICE BASED ON POSITIVE AND NEGATIVE AIR PRESSURE

(71) Applicant: Dongguan Xiweier Electronic Technology Co., Ltd., Dongguan (CN)

(72) Inventor: Qian Liu, Changde (CN)

( * ) Notice: Subject to any disclaimer, the term of this patent is extended or adjusted under 35 U.S.C. 154(b) by 0 days.

(21) Appl. No.: 18/986,975

(22) Filed: Dec. 19, 2024

(30) Foreign Application Priority Data

Nov. 6, 2024 (CN) ......................... 202411576017.1

(51) Int. Cl.
*A61H 9/00* (2006.01)

(52) U.S. Cl.
CPC ... *A61H 9/0057* (2013.01); *A61H 2201/1238* (2013.01); *A61H 2201/1671* (2013.01)

(58) Field of Classification Search
CPC ...... F04B 43/02; F04B 43/0054; F04B 45/04; A61H 7/00; A61H 7/001; A61H 7/007; A61H 7/008; A61H 9/0057; A61H 2201/1238; A61H 2201/1671; A61H 23/02
See application file for complete search history.

(56) References Cited

U.S. PATENT DOCUMENTS

| | | | | |
|---|---|---|---|---|
| 12,318,352 B2 * | 6/2025 | Luo | ........................ | A61H 9/005 |
| 2001/0014288 A1 * | 8/2001 | Lynn | .................. | F04B 27/1036<br>417/269 |
| 2017/0074260 A1 * | 3/2017 | Yan | ........................ | A61H 1/008 |

FOREIGN PATENT DOCUMENTS

| | | | | |
|---|---|---|---|---|
| CN | 116763628 A * | 9/2003 | ............ | A61H 23/02 |

* cited by examiner

*Primary Examiner* — Justine R Yu
*Assistant Examiner* — Matthew R Moon

(57) ABSTRACT

Disclosed is a rotary massage device based on positive and negative air pressure, including a housing, a rotating shaft, and a driving device. A first accommodating space is arranged in the housing, at least one chamber is arranged in the first accommodating space, a side wall of the chamber is provided with an assembly opening, the housing is provided with a suction opening, the suction opening is communicated with the chamber, and the rotating shaft is rotatably mounted at the assembly opening. Further, at least one swinging member is arranged on the rotating shaft, the swinging member extends into the chamber, the driving device is mounted inside the housing, and the driving device is drivingly-connected to one end of the rotating shaft.

6 Claims, 8 Drawing Sheets

ROTARY MASSAGE DEVICE BASED ON POSITIVE AND NEGATIVE AIR PRESSURE

CROSS REFERENCE TO RELATED APPLICATIONS

The present application claims the priority of Chinese patent application No. 202411576017.1, filed on Nov. 6, 2024, and contents of which are incorporated herein by reference.

TECHNICAL FIELD

The present disclosure relates to the technical field of massage therapy, and in particular to a rotary massage device based on positive and negative air pressure.

BACKGROUND

Massage is a method of physical therapy based on the theories of traditional Chinese medicine including the inner organs theory and the meridian and collateral theory, in combination with anatomy and pathological diagnosis theories of Western medicine. Massage is capable of regulating physiological and pathological conditions of human body through manipulation therapy on specific parts of human body. Massage is essentially a physical therapy method. Massage can be divided into healthcare massage, sports massage, and medical massage.

With the development of the times and technological progress, massage in the prior art is no longer limited to manual massage, but relies more on use of massage devices. For example, the massage devices in the prior art such as massage chairs, foot massagers, neck massagers and the like, do not perform targeted massage to affected parts of human body according to the law of human body vasodilatation, but apply means of direct contact and pressing in a mechanical manner, which causes significant damage to human skin, resulting in that a massage effect is not ideal.

Therefore, some air compression massagers that achieve indirect massage through air sucking and blowing have emerged on the market. The air compression massagers are massage appliances capable of alleviating fatigue and soreness and promoting blood circulation by sucking and relaxing skin and muscles in a process that negative pressure is generated through a pressure field mechanism to create an absorption effect. However, massage devices based on positive and negative air pressure are usually provided with pistons that move linearly and reciprocally inside chambers to generate negative pressure, and a conventional motion method results in a poor adsorption effect of negative pressure generated. Therefore, there is an urgent need to provide a massage device based on positive and negative air pressure capable of generating negative pressure through a novel motion method.

SUMMARY

An objective of the present disclosure is to provide a rotary massage device based on positive and negative air pressure, so as to solve at least one of the technical problems in the prior art.

In order to achieve the above objective, in a first aspect, a rotary massage device based on positive and negative air pressure is provided in a technical solution of the present disclosure, including:

a housing, where a first accommodating space is arranged in the housing, at least one chamber is arranged in the first accommodating space, a side wall of the chamber is provided with an assembly opening, the housing is provided with a suction opening, and the suction opening is communicated with the chamber;

a rotating shaft, where the rotating shaft is rotatably mounted at the assembly opening, at least one swinging member is arranged on the rotating shaft, and the swinging member extends into the chamber; and a driving device, where the driving device is mounted in the housing, and the driving device is drivingly-connected to one end of the rotating shaft, such that the driving device drives the rotating shaft to rotate and drives the swinging member to swing reciprocally along an inner wall of the chamber, so as to generate positive pressure and negative pressure alternating periodically at the suction opening.

Further, a first gap is formed between the swinging member and the inner wall of the chamber, and a width of the first gap is not greater than 1 mm; and and/or a second gap is formed between the rotating shaft and a partition and a width of the second gap is not greater than 1 mm.

Further, the swinging member can be of a vane-board structure that extends in a way of radially protruding from the rotating shaft.

Further, an extension plane where the swinging member is located is arranged to be parallel to a central axis of the rotating shaft.

Further, a groove is formed at a bottom of the first accommodating space, the rotating shaft is rotatably mounted inside the groove through a bearing, an outer ring of the bearing is arranged inside the groove in an embedded manner, and an inner ring of the bearing is sleeved on the rotating shaft.

Further, a plurality of the chambers are arranged, the plurality of the chambers are arranged around the central axis of the rotating shaft, the assembly opening is located at a center of the first accommodating space, a plurality of the swinging members are arranged, the plurality of the swinging members, through the assembly opening, are arranged in the plurality of the chambers in one-to-one correspondence, and all the plurality of the chambers are communicated with the suction opening.

Further, a concentrated chamber is arranged in an upper part of the first accommodating space, the concentrated chamber is communicated with the suction opening, all the plurality of the chambers are communicated with the concentrated chamber, and all the plurality of the chambers are communicated with the suction opening through the concentrated chamber.

Further, inside of each of the chambers is divided by the respective swinging member into a compression chamber and a communication chamber, the compression chamber is communicated with the suction opening, the communication chamber is provided with a communication hole, and the communication chamber, through the communication hole, is communicated with an external environment.

Further, the driving device comprises:

a driving part;

a cam, wherein a lower part of the cam is connected to an output shaft of the driving part such that the driving part drives the cam to rotate;

a sliding piece, wherein the sliding piece is slidably arranged inside the housing, and the sliding piece is movably connected to an upper part of the cam such that the sliding piece moves linearly and reciprocally when the cam rotates; and a connecting rod, wherein one end of the connecting rod is movably connected to the sliding piece, and the other end of the connecting rod is fixedly connected to one end of the rotating shaft, such that through the connecting rod, linear reciprocating motion of the sliding piece is converted into reciprocating swinging motion of the swinging member on the rotating shaft.

Further, a guiding structure is arranged between the sliding piece and an inner wall of the housing to guide the reciprocating motion of the sliding piece through the guiding structure, and a movement direction of the sliding piece is arranged to be perpendicular to a rotational axis of the cam.

Further, a strip-shaped groove is formed at a bottom of the sliding piece, the upper part of the cam is movably arranged in the strip-shaped groove in an embedded manner, and a length extension direction of the strip-shaped groove is arranged to be perpendicular to the movement direction of the sliding piece.

Further, an upper part of the sliding piece extends in a protruding manner to form a shaft end, one end of the connecting rod is provided with an opening structure, the shaft end of the sliding piece can be movably arranged in the opening structure in an embedded manner, and the other end of the connecting rod is provided with a connecting hole, such that one end of the rotating shaft is arranged in the connecting hole for fixing in an inserted manner, and a rotational axis of the rotating shaft is arranged to be perpendicular to the movement direction of the sliding piece.

In a second aspect, a rotary massage device based on positive and negative air pressure is provided in a technical solution of the present disclosure, including:

a housing, where a first accommodating space is arranged in the housing, the first accommodating space is divided by a partition plate into at least two chambers, the partition plate is provided with an assembly opening, the housing is provided with a suction opening, and the suction opening is communicated with the chamber;

a rotating shaft, where the rotating shaft is rotatably mounted at the assembly opening, at least two swinging members are arranged on the rotating shaft at an interval in a circumferential direction, at least two of the swinging members extend into at least two of the chambers in one-to-one correspondence respectively, and at least two of the chambers are arranged around a central axis of the rotating shaft; and a driving device, where the driving device is arranged in the housing, and the driving device is drivingly-connected to one end of the rotating shaft, such that the driving device drives the rotating shaft to rotate and drives the swinging member to swing reciprocally along an inner wall of the chamber, so as to generate positive pressure and negative pressure alternating periodically at the suction opening.

Further, inside of each of the chambers is divided by the respective swinging member into a compression chamber and a communication chamber, the compression chamber is communicated with the suction opening, the communication chamber is provided with a communication hole, and the communication chamber, through the communication hole, is communicated with an external environment; and a plurality of the compression chambers and a plurality of the communication chambers are alternately arranged and distributed in one-to-one correspondence in a circumferential direction.

Further, the first accommodating space is generally cylindrical, an arc-shaped wall is formed on a side wall of the chamber away from the rotating shaft, and the swinging member swings reciprocally along the arc-shaped wall of the chamber.

Further, a concentrated chamber is arranged in an upper part of the first accommodating space, the concentrated chamber is communicated with the suction opening, at least two of the chambers are communicated with the concentrated chamber, and at least two of the chambers are communicated with the suction opening through the concentrated chamber.

Further, a groove is formed at a bottom of the first accommodating space, the rotating shaft is rotatably mounted inside the groove through a bearing, an outer ring of the bearing is arranged inside the groove in an embedded manner, and an inner ring of the bearing is sleeved on the rotating shaft.

Further, the swinging member can be the vane-board structure that extends in a way of radially protruding from the rotating shaft, the first gap is formed between the swinging member and the inner wall of the chamber, and a width of the first gap is not greater than 1 mm; and the second gap is formed between the rotating shaft and the partition plate, and a width of the second gap is not greater than 1 mm.

Further, the driving device comprises:

a driving part;

a cam, wherein a lower part of the cam is connected to an output shaft of the driving part such that the driving part drives the cam to rotate;

a sliding piece, wherein the sliding piece is slidably arranged inside the housing, and the sliding piece is movably connected to an upper part of the cam such that the sliding piece moves linearly and reciprocally when the cam rotates, and a movement direction of the sliding piece is arranged to be perpendicular to a rotational axis of the cam; and a connecting rod, wherein one end of the connecting rod is movably connected to the sliding piece, and the other end of the connecting rod is fixedly connected to one end of the rotating shaft, such that through the connecting rod, linear reciprocating motion of the sliding piece is converted into reciprocating swinging motion of the swinging member on the rotating shaft, and a rotational axis of the rotating shaft is arranged to be perpendicular to the movement direction of the sliding piece.

In a third aspect, a rotary massage device based on positive and negative air pressure is provided in a technical solution of the present disclosure, including:

a housing, where a chamber is arranged in the housing, the housing is provided with a suction opening, and the suction opening is communicated with the chamber;

a rotating shaft, where the rotating shaft is rotatably mounted inside the chamber, the rotating shaft is arranged close to a first side wall of the chamber, at least one swinging member is arranged on the rotating shaft, the swinging member is arranged in a way of extending toward a second side wall of the chamber, and the second side wall of the chamber is an arc-shaped wall;

a driving device, wherein the driving device is mounted in the housing, and the driving device is drivingly-connected to one end of the rotating shaft, such that the driving device drives the rotating shaft to rotate and drives the swinging member to swing reciprocally along an arc-shaped wall of the chamber, so as to generate positive pressure and negative pressure alternating periodically at the suction opening; and a third gap is formed between the rotating shaft and an inner wall of the chamber, and a width of the third gap is not greater than 1 mm, and the first gap is formed between the swinging member and the inner wall of the chamber, and a width of the first gap is not greater than 1 mm.

It may be seen from the technical solution that in the rotary massage device based on positive and negative air pressure of the present disclosure, the driving device drives the rotating shaft to rotate and drives the outer wall of the swinging member to swing reciprocally along the inner wall of the chamber, such that a volume of an air chamber formed between the swinging member and the inner wall of the chamber increases or decreases when the swinging member swings reciprocally, air at the suction opening is sucked into the chamber or air in the chamber is compressed and exhaled to the suction opening, and the positive pressure and negative pressure alternating can be generated periodically at the suction opening, thereby achieving effects of sucking and relaxing massage areas of human body. With a relatively novel method of generating the positive pressure and negative pressure, the present disclosure has a simple structure, is safe and reliable in use, and achieves a good suction effect.

In order to make the technical concept and other objects, advantages, features and effects of the present disclosure clearer and more comprehensible, preferred embodiments will be specifically cited in the following specific implementation modes and described in detail in conjunction with the accompanying drawings.

BRIEF DESCRIPTION OF THE DRAWINGS

In order to illustrate the technical solution in embodiments of the present disclosure more clearly, the following briefly introduces accompanying drawings used in the description of the embodiments. Obviously, the accompanying drawings in the following description are only some embodiments of the present disclosure. Those of ordinary skill in the art can obtain other accompanying drawings from these accompanying drawings without any creative efforts.

DETAILED DESCRIPTIONS OF THE EMBODIMENTS

Figure 1:
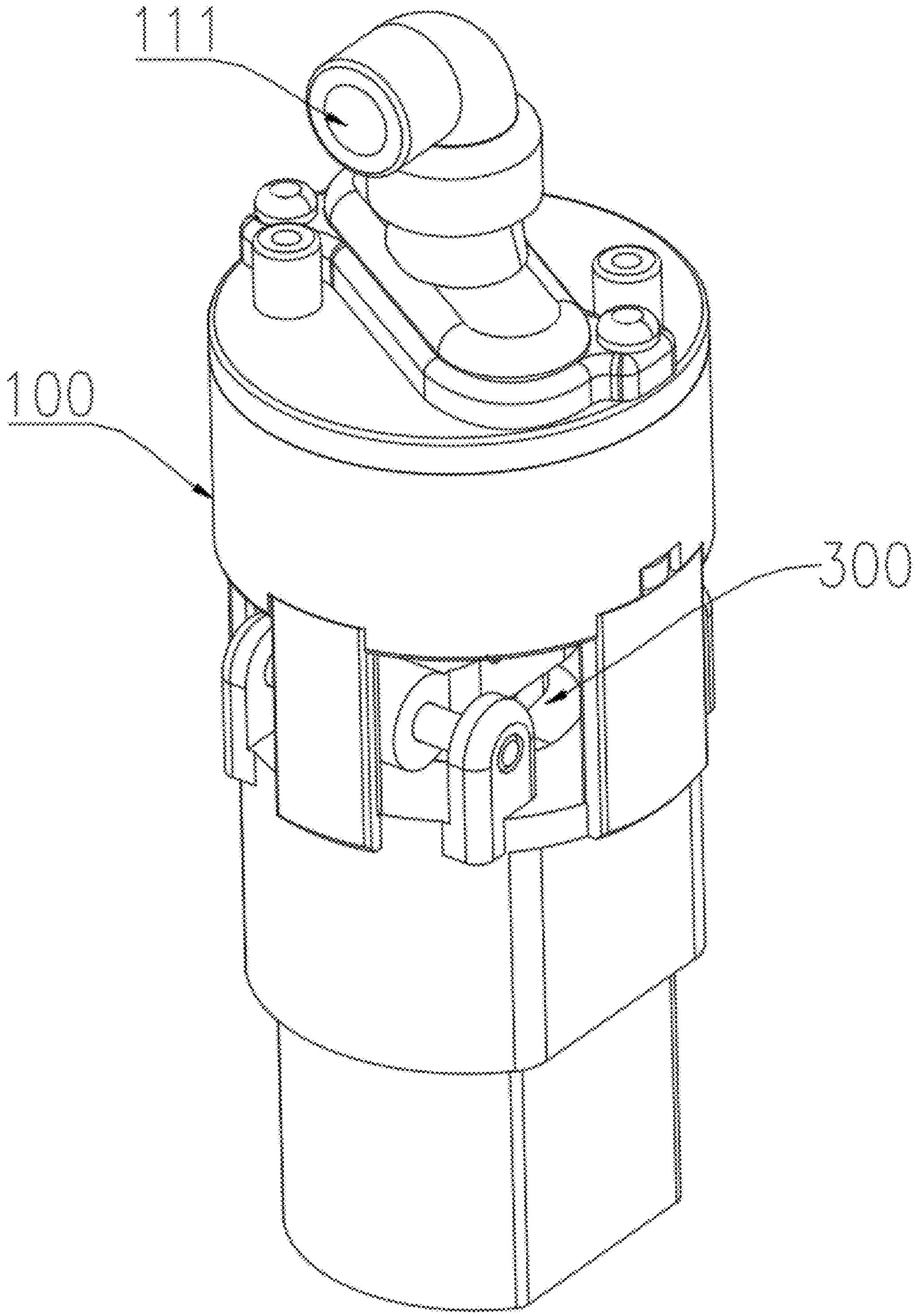
FIG. 1 is a space diagram of a rotary massage device based on positive and negative air pressure provided in an example of the present disclosure.
Figure 2:
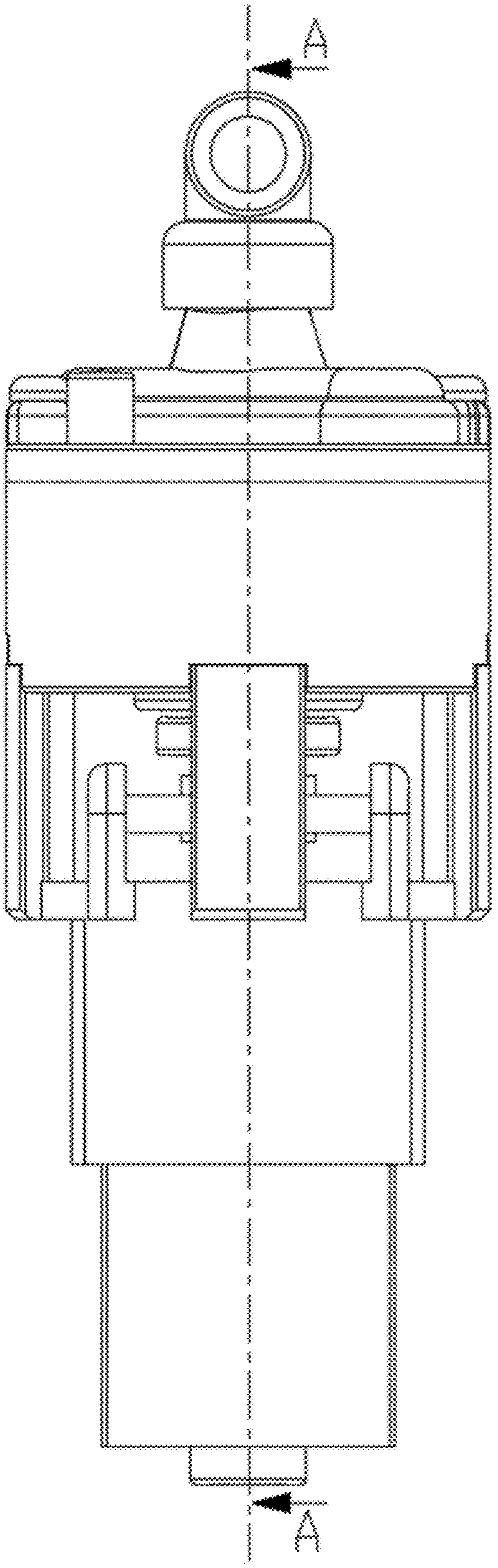
FIG. 2 is a front view of a rotary massage device based on positive and negative air pressure provided in an example of the present disclosure.
Figure 3:
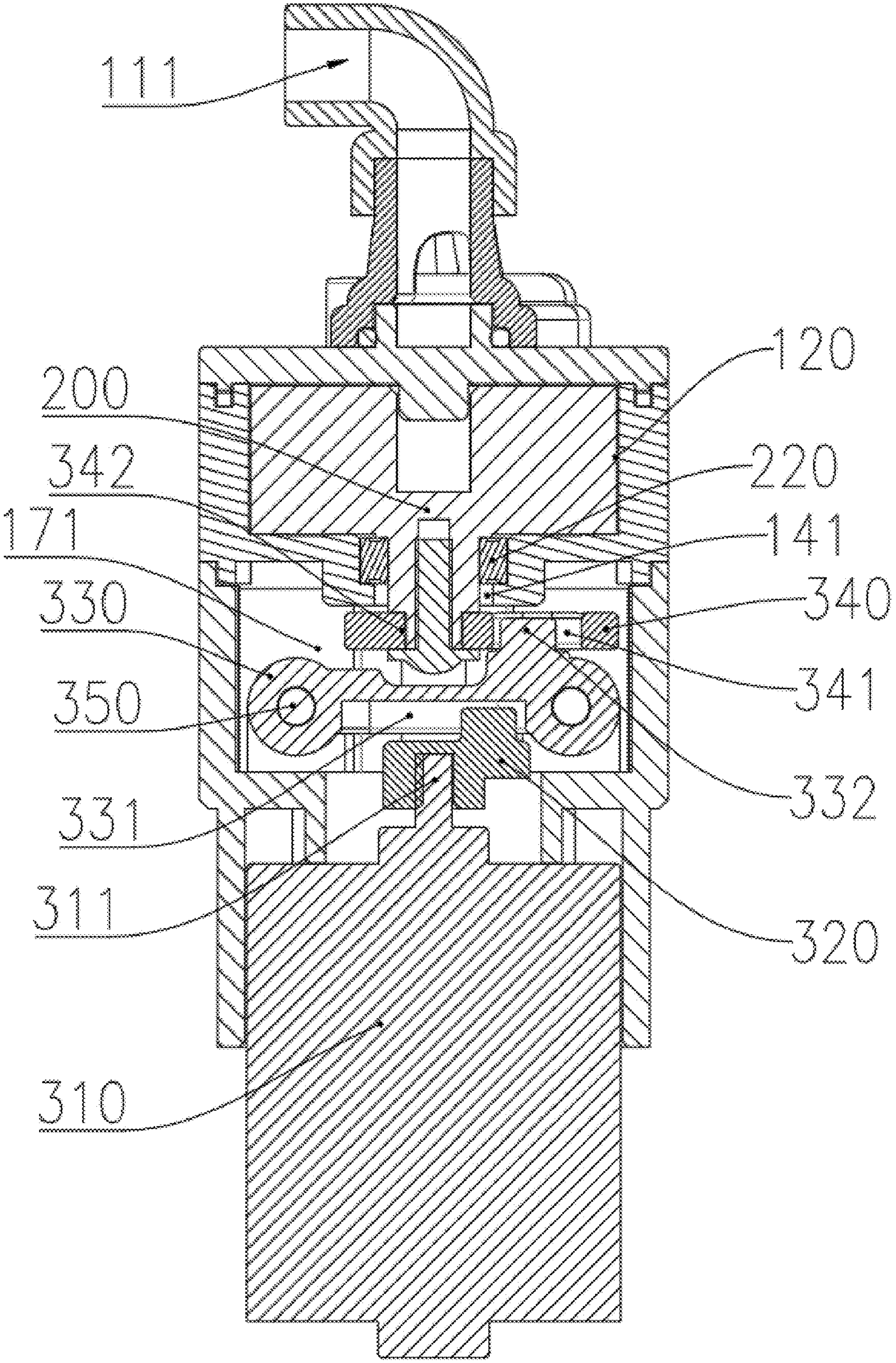
FIG. 3 is a sectional view of a section A-A in FIG. 2 provided in an example of the present disclosure.

In order to make those skilled in the art better understand the technical solution of the present disclosure, the technical solution in the embodiments of the present disclosure will be clearly and completely described below with reference to accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without any creative efforts fall within the protection scope of the present disclosure.

With reference to FIGS. 1-8, a rotary massage device based on positive and negative air pressure is provided in this example, including a housing 100, a rotating shaft 200, and a driving device 300. A first accommodating space 120 is arranged in the housing 100, at least one chamber is arranged in the first accommodating space 120, a side wall of the chamber is provided with an assembly opening 124, the housing 100 is provided with a suction opening 111, the suction opening 111 is communicated with the chamber, and the rotating shaft 200 is rotatably mounted at the assembly opening 124. Further, at least one swinging member 210 is arranged on the rotating shaft 200, the swinging member 210 extends into the chamber, the driving device 300 is mounted inside the housing 100, and the driving device 300 is drivingly-connected to one end of the rotating shaft 200, such that the driving device 300 drives the rotating shaft 200 to rotate and drives an outer wall of the swinging member 210 to swing reciprocally along an inner wall of the chamber, so as to generate positive pressure and negative pressure alternating periodically at the suction opening 111.

It can be seen that in the rotary massage device based on positive and negative air pressure in this example, the driving device 300 drives the rotating shaft 200 to rotate and drives the outer wall of the swinging member 210 to swing reciprocally along the inner wall of the chamber, such that a volume of an air chamber formed between the swinging member 210 and the inner wall of the chamber increases or decreases when the swinging member 210 swings reciprocally, air at the suction opening 111 is sucked into the chamber or air in the chamber is compressed and exhaled to the suction opening 111, and the positive pressure and negative pressure alternating can be generated periodically at the suction opening 111, thereby achieving effects of alleviating fatigue and soreness by absorbing and relaxing skin muscles, and promoting blood circulation. With a relatively novel method of generating the positive pressure and negative pressure, the present disclosure has a simple structure, is safe and reliable in use, and achieves a good adsorption effect.

In this example, the first gap is formed between the swinging member 210 and the inner wall of the chamber, a width of the first gap is not greater than 1 mm, and preferably, the width of the first gap is 0-0.1 mm, such that the swinging member 210 is capable of swinging reciprocally stably and reliably inside the chamber, and to some extent, it is ensured that air pressure changes inside the chamber are sufficient to generate the positive pressure and negative pressure alternating periodically at the suction opening 111; and/or gap is formed between the rotating shaft 200 and the partition plate 123, a width of the second gap is not greater than 1 mm, and preferably, the width of the second gap is 0-0.1 mm, such that when smooth rotation of the rotating shaft 200 at the assembly opening 124 is not affected, rapid exchange of most of gas in the chamber with an external environment through the second gap is avoided to ensure an effect of the positive pressure and negative pressure generated at the suction opening 111, thereby ensuring sealing effectiveness to a certain extent.

Specifically, the rotating shaft 200 has a generally cylindrical structure, and at least part of two opposite side walls of the assembly opening 124 are of arc-shaped smooth transition, such that the rotating shaft 200 rotates more stably and smoothly, and normal operation of the rotating shaft 200 is not affected by structural interference. Further, the rotating shaft 200, through the assembly opening 124, is at least partially accommodated in the chamber, the swinging member 210 is arranged on a surface of part of the rotating shaft 200 in the chamber, the first accommodating space 120 is generally cylindrical, a side wall of the chamber away from the rotating shaft 200 is at least partially an arc-shaped wall, and the swinging member 210 swings reciprocally along the arc-shaped wall of the chamber, such that when the rotating shaft 200 rotates and drives the swinging member 210 to swing reciprocally, the device operates more stably and smoothly, and the effect of the positive pressure and negative pressure generated at the suction opening 111 is better.

In another example, the assembly opening 124 can be omitted, the rotating shaft 200 is rotatably mounted inside the chamber, the rotating shaft 200 is arranged close to a first side wall of the chamber, the swinging member 210 is arranged m a way of extending toward a second side wall of the chamber, the second side wall of the chamber is at least partially an arc-shaped wall, and the swinging member 210 swings reciprocally along the arc-shaped wall of the chamber, such that when the swinging member 210 swings reciprocally, the swinging member 210 is tightly fitted with the second side wall of the chamber. Further, the third gap is formed between the rotating shaft 200 and the inner wall of the chamber and the first gap is also formed between the swinging member 210 and the inner wall of the chamber, and the widths of the first gap and the third gap are not greater than 1 mm, such that when the swinging member 210 swings reciprocally inside the chamber, the positive pressure and negative pressure alternating periodically can be generated at the suction opening 111. It should be understood that this implementation also falls within the protection scope of the present disclosure.

Further, the swinging member 210 can be of the vane-board structure that extends in a way of radially protruding from the rotating shaft 200, and a plane where the vane-board is located is arranged to be approximately parallel to a central axis of the rotating shaft 200, such that when the rotating shaft 200 drives the vane-board to swing reciprocally, the device operates more stably and smoothly, and has a simple and compact structure with lower processing difficulty and production costs.

In this example, a groove 142 is formed at a bottom of the first accommodating space 120, the rotating shaft 200 is rotatably mounted inside the groove 142 through a bearing 220, an outer ring of the bearing 220 is arranged inside the groove 142 in an embedded manner, and an inner ring of the bearing 220 is sleeved on the rotating shaft 200, such that the rotating shaft 200, through the bearing 220, can be rotatably mounted, the rotating shaft 200 drives the swinging member 210 to swing reciprocally in a more stable and smooth manner, the effect of the positive pressure and negative pressure generated at the suction opening 111 is better, and assembly of the bearing 220 through the groove 142 is structurally simple, convenient and efficient.

In an example, a plurality of the chambers are arranged, the plurality of the chambers are arranged around the central axis of the rotating shaft 200, the assembly opening 124 is located at a center of the first accommodating space 120, a plurality of the swinging members 210 are arranged, the plurality of the swinging members 210, through the assembly opening 124, are arranged in the plurality of the chambers in one-to-one correspondence, a concentrated chamber 130 is arranged in an upper part of the first accommodating space 120, the concentrated chamber 130 is communicated with the suction opening 111, all the plurality of the chambers are communicated with the concentrated chamber 130, and all the plurality of the chambers are communicated with the suction opening 111 through the concentrated chamber 130, such that when the rotating shaft 200 drives the plurality of the swinging members 210 to swing reciprocally in the plurality of the chambers, positive pressure and negative pressure generated are unified and concentrated in the concentrated chamber 130, and the higher positive pressure and negative pressure can be generated at the suction opening 111, thereby further enhancing a suction effect and intensity.

Specifically, inside of each of the chambers is divided by the respective swinging member 210 into a compression chamber 121 and a communication chamber 122, the compression chamber 121 is communicated with the suction opening 111, the communication chamber 122 is provided with a communication hole 151, the communication chamber 122, through the communication hole 151, is communicated with an external environment, to prevent the swinging member 210 from being hindered by the air pressure inside the communication chamber 122 when it swings toward the communication chamber 122, and a plurality of the compression chambers 121 and a plurality of the communication chambers 122 are alternately arranged and distributed in one-to-one correspondence in a circumferential direction, such that when the rotating shaft 200 drives the swinging members 210 to swing reciprocally, the plurality of the swinging members 210 are capable of simultaneously swinging toward either the compression chambers 121 or the communication chambers 122 in their respective chambers respectively, and the plurality of the swinging members 210 swing reciprocally to collectively generate a sum of the positive pressure or negative pressure at the suction opening 111.

Figure 4:
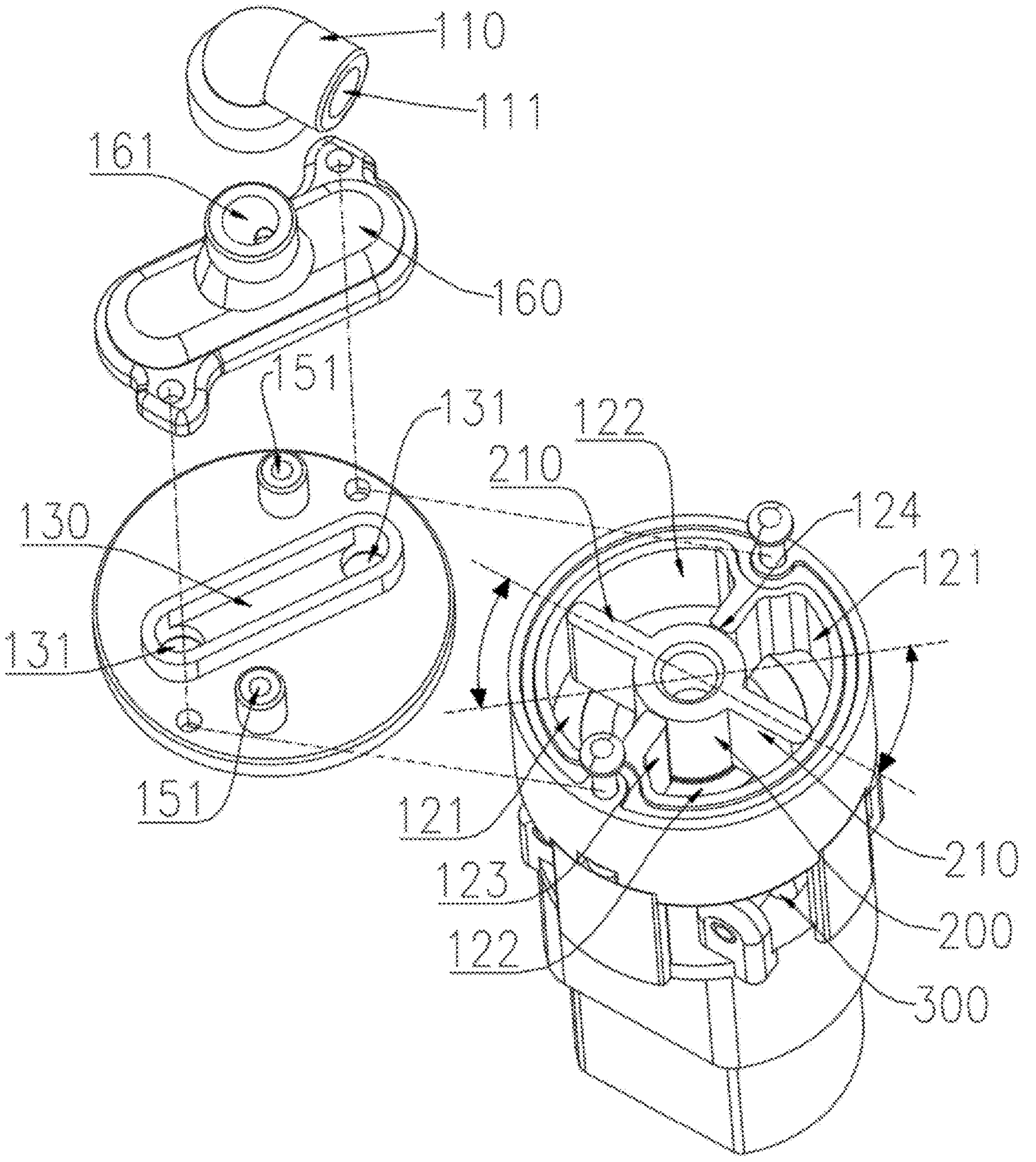
FIG. 4 is an exploded view of a partial structure of a rotary massage device based on positive and negative air pressure provided in an example of the present disclosure.
Figure 5:
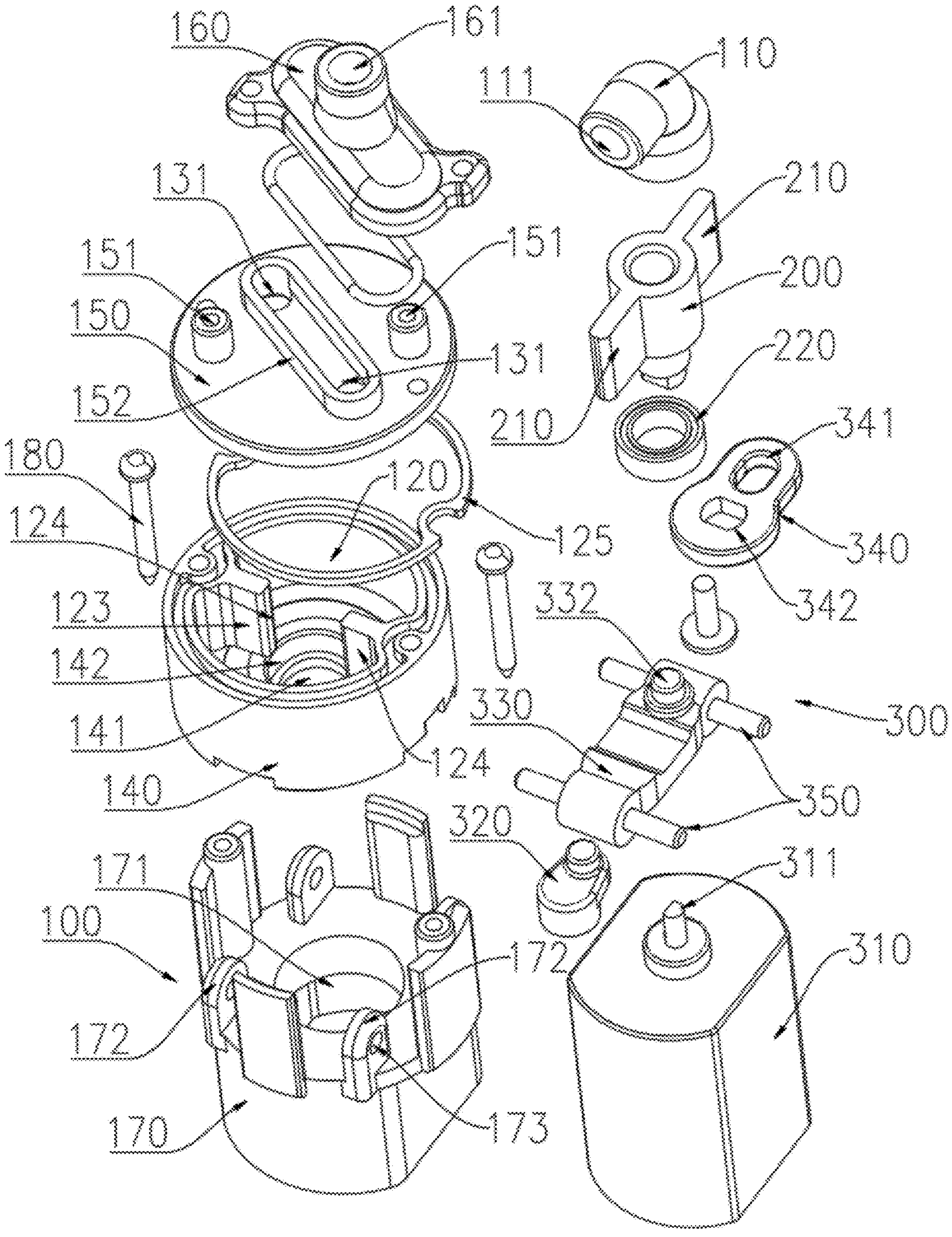
FIG. 5 is a structural exploded view of a rotary massage device based on positive and negative air pressure provided in an example of the present disclosure.
Figure 6:
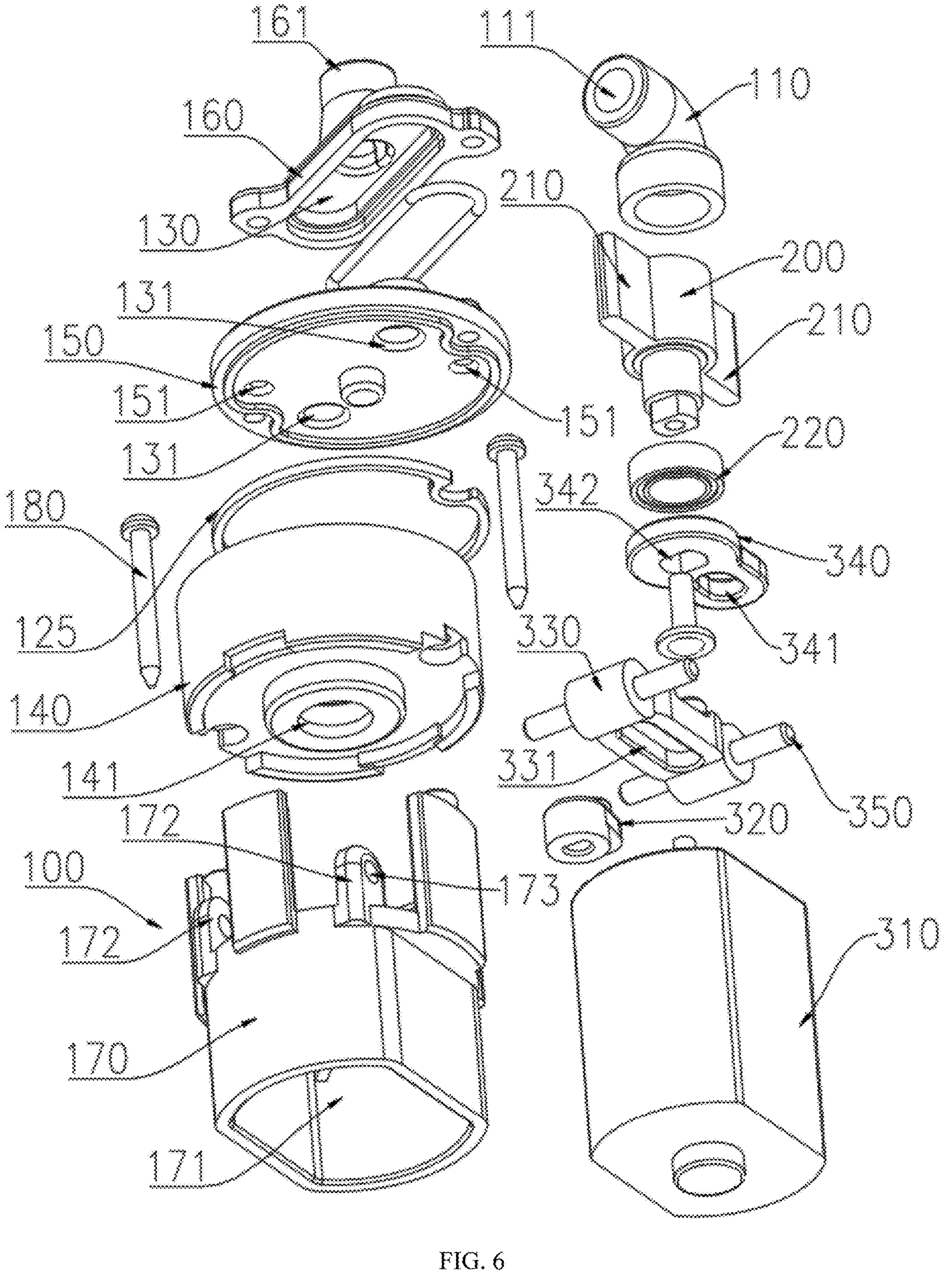
FIG. 6 is a structural exploded view of another view of a rotary massage device based on positive and negative air pressure provided in an example of the present disclosure.
Figure 7:
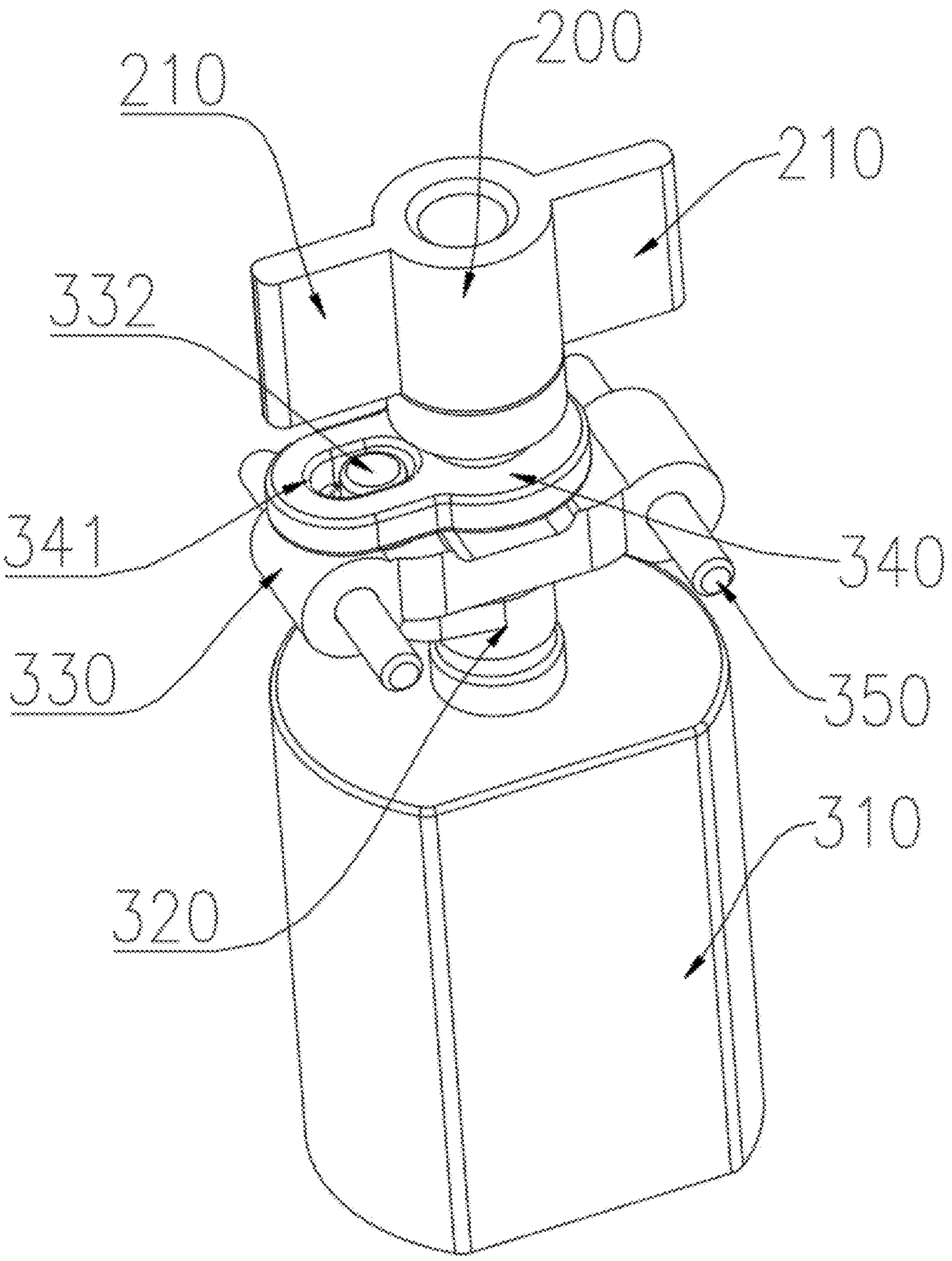
FIG. 7 is a structural schematic diagram of assembly of a driving device, a rotating shaft and a swinging member provided in an example of the present disclosure.
Figure 8:
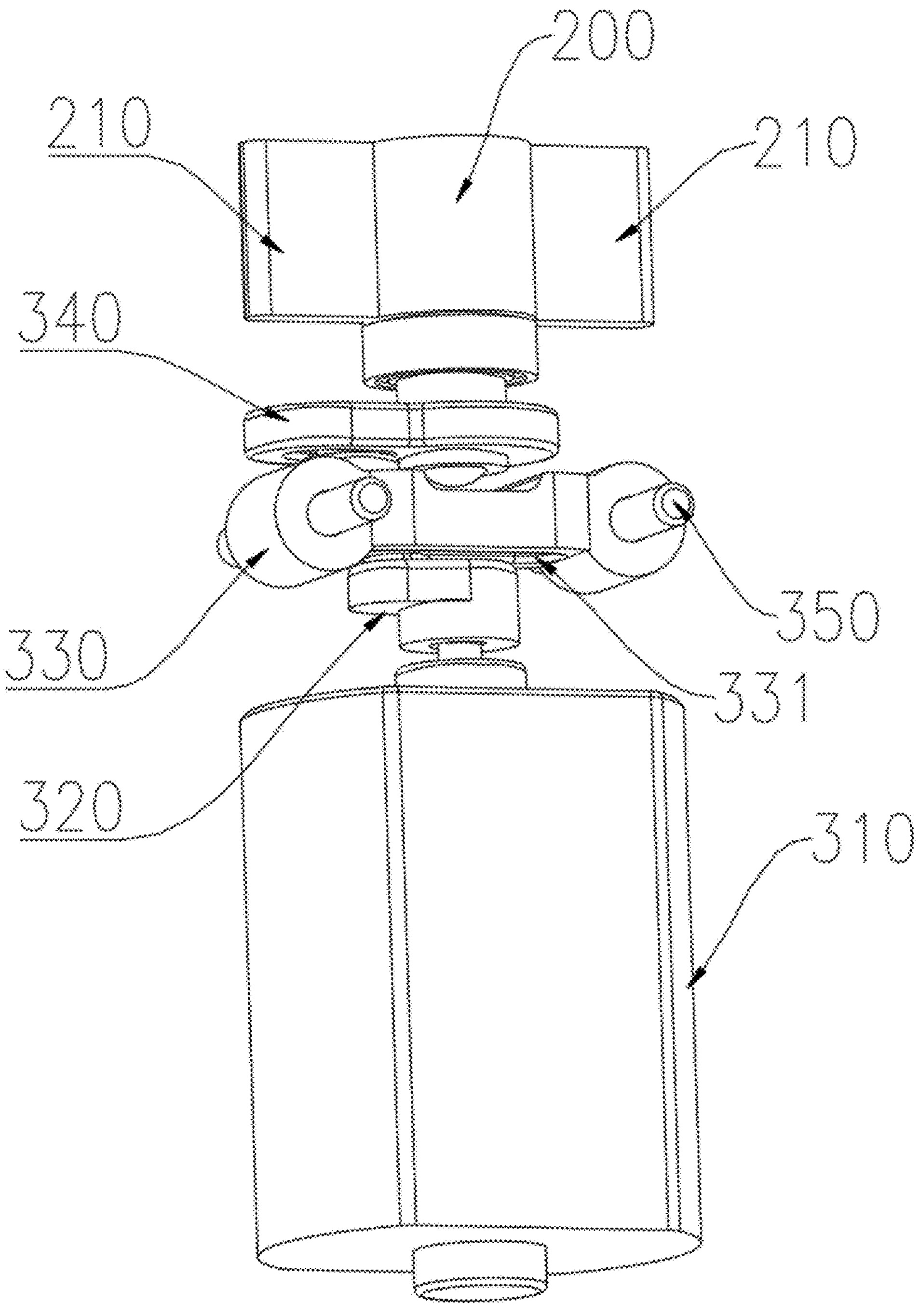
FIG. 8 is a structural schematic diagram of another view of assembly of a driving device, a rotating shaft and a swinging member provided in an example of the present disclosure.

As illustrated in FIG. 4, when the swinging member 210 swings toward the compression chamber 121, the air inside the compression chamber 121 is compressed and flows toward the suction opening 111 to produce a blowing effect, and when the swinging member 210 swings away from the compression chamber 121, a volume between the compression chamber 121 and the swinging member 210 increases, such that air at the suction opening 111 flows toward the compression chamber 121 to produce the suction effect at the suction opening 111. An angle at which the swinging member 210 swings reciprocally around the central axis of the rotating shaft 200 is greater than 20° and less than 180°, preferably greater than or equal to 30° and less than or equal to 90°. In this case, the sucking and blowing effects are produced at the suction opening 111, and massage areas of human body can be sucked and relaxed.

Further, the housing 100 includes a ring seat 140 and a cover body 150 that are engaged with each other, the ring seat 140 and the cover body 150 are fixed by screws 180 to form the first accommodating space 120 between the ring seat 140 and the cover body 150, and a first sealing ring 125 is formed between the ring seat 140 and the cover body 150 to ensure the sealing effectiveness of the chamber through the first sealing ring 125. The communication hole 151 is formed in the cover body 150, a through hole 141 is formed at a bottom of the ring seat 140, one end of the rotating shaft 200 is arranged in the through hole 141 in a penetrating manner, and the through hole 141 is coaxially arranged with the groove 142 in a hollow-through manner. A diameter of the through hole 141 is smaller than an inner diameter of the groove 142, to form a limiting step for axially limiting the bearing 220 between the groove 142 and the through hole 141.

Preferably, a bottom wall of the assembly opening 124 and the groove 142 are arranged in a hollow-through manner to facilitate rotatable mounting of the rotating shaft 200, and the width of a gap between an upper end of the rotating shaft 200 and an inner surface of the cover body 150, as well as that of a gap between a top wall of the swinging member 210 and the inner surface of the cover body 150, is not greater than 1 mm. An upper part of the cover body 150 extends in a protruding manner to form an annular wall 152, an upper part of the annular wall 152 is covered by a chamber cover 160 to form the concentrated chamber 130 between the annular wall 152 and the chamber cover 160, and a second sealing ring is arranged between the annular wall 152 and the chamber cover 160 to ensure the sealing effectiveness of the concentrated chamber 130 through the second sealing ring. An airflow hole 131 is formed in a top wall of each of the plurality of the compression chambers 121, the airflow hole 131 of each of the plurality of the compression chambers 121 is communicated with the concentrated chamber 130, an upper part of the chamber cover 160 extends in a protruding manner to form an air pipe orifice 161, the air pipe orifice 161 is communicated with the concentrated chamber 130, and the air pipe orifice 161 is communicated with a cover body 110, to form the suction opening 111 at an opening of the cover body 110.

In this example, the driving device 300 includes a driving part 310, a cam 320, a sliding piece 330, and a connecting rod 340, where a lower part of the cam 320 is connected to an output shaft 311 of the driving part 310 such that the driving part 310 drives the cam 320 to rotate, the sliding piece 330 is slidably arranged inside the housing 100, the sliding piece 330 is movably connected to an upper part of the cam 320 such that the sliding piece 330 moves linearly and reciprocally when the cam 320 rotates, one end of the connecting rod 340 is movably connected to the sliding piece 330, and the other end of the connecting rod 340 is fixedly connected to one end of the rotating shaft 200, such that through the connecting rod 340, linear reciprocating motion of the sliding piece 330 is converted into reciprocating swinging motion of the swinging member 210 on the rotating shaft 200.

Specifically, the driving part 310 may be a driving motor, and a guiding structure is arranged between the sliding piece 330 and the housing 100 to guide the reciprocating motion of the sliding piece 330 through the guiding structure. A sliding direction of the sliding piece 330 is arranged to be perpendicular to a rotational axis of the cam 320, a strip-shaped groove 331 is formed at a bottom of the sliding piece 330, and the upper part of the cam 320 is movably arranged in the strip-shaped groove 331 in an embedded manner. A length extension direction of the strip-shaped groove 331 is arranged to be perpendicular to a sliding direction of the sliding piece 330, and the length extension direction of the strip-shaped groove 331 is arranged to be perpendicular to a rotational axis of the cam 320. An upper part of the sliding piece 330 extends in a protruding manner to form a shaft end 332, one end of the connecting rod 340 is provided with an opening structure 341, the shaft end 332 of the sliding piece 330 can be movably arranged in the opening structure 341 in an embedded manner, the opening structure 341 is generally an elliptical hole, and the other end of the connecting rod 340 is provided with a connecting hole 342, such that one end of the rotating shaft 200 is arranged in the connecting hole 342 for fixing in an inserted manner.

Further, the housing 100 further includes a base 170, the base 170 is arranged at a lower part of the ring seat 140 to form a second accommodating space 171 between the base 170 and the ring seat 140, the driving device 300 is mounted on the base 170, the guiding structure is arranged between the base 170 and the sliding piece 330, the guiding structure includes at least one guiding rod 350 and at least one guiding hole, and the guiding hole is formed in the sliding piece 330, which ensures that the sliding piece 330 is slidably sleeved on the guiding rod 350 through the guiding hole, such that when the driving part 310 drives the cam 320 to rotate, the upper part of the cam 320 moves inside the strip-shaped groove 331 so as to drive the sliding piece 330 to move reciprocally along the guiding rod 350, and the shaft end 332 of the sliding piece 330 is in movable fit with the opening structure 341, which drives the swinging member 210 on the rotating shaft 200 to swing reciprocally.

Optionally, the guiding holes are formed at both ends of the sliding piece 330, the number of the guiding rods 350 is two, the two guiding rods 350 are arranged in the two guiding holes in a penetrating manner, two sets of supports 172 are arranged on the base 170, either set includes two of the supports 172, the two supports 172 are opposite to and spaced apart from each other, a fixing hole 173 is formed in each of the supports 172, and both ends of either of the guiding rods 350 are respectively mounted in the fixing holes 173 of the two supports 172 that are opposite to each other.

In some examples, the first accommodating space 120 is divided by a partition plate 123 into at least two chambers, at least two of the chambers are arranged around the central axis of the rotating shaft 200, the partition plate 123 is provided with the assembly opening 124, and preferably the assembly opening 124 is arranged at a center of the partition plate 123. The partition plate 123 can be composed of one or more plates, the rotating shaft 200 is rotatably mounted at the assembly opening 124, and at least two swinging members 210 are arranged on the rotating shaft 200 at an interval in a circumferential direction, such that an outer peripheral surface of the rotating shaft 200, through the assembly opening 124, can be partially accommodated in each chamber. at least two of the swinging members 210 extend into at least two chambers in one-to-one correspondence respectively, each of the swinging members 210 is respectively arranged on part of the outer peripheral surface of the rotating shaft 200 in a corresponding chamber, and the suction opening 111 is communicated with the compression chambers 121 of at least two chambers, such that the positive pressure and negative pressure alternating periodically can be generated at the suction opening 111 in a way of combination.

In this example, the first accommodating space 120 and the second accommodating space 171 are arranged in the housing 100, at least one chamber is arranged in the first accommodating space 120, and the through hole 141 is formed between the first accommodating space 120 and the second accommodating space 171. One end of the rotating shaft 200 is arranged in the through hole 141 in a penetrating manner, the driving device 300 is mounted in the second accommodating space 171, and the driving device 300 is drivingly-connected to one end of the rotating shaft 200, such that the driving device 300 drives the rotating shaft 200 to rotate and drives the swinging member 210 to swing reciprocally along an inner wall of the chamber, so as to generate positive pressure and negative pressure alternating periodically at the suction opening 111. According to such arrangement, the driving device 300 is mounted in the second accommodating space 171, and an impeller formed by combining the swinging member 210 and the rotating shaft 200, and also the chamber where a pressure field is generated, are both arranged in the first accommodating space 120, which not only ensures airtightness of the chamber, but also facilitates combination and assembly of the driving device 300. With a simple and reasonable spatial layout, the present disclosure is mounted in a convenient and efficient manner, and features low production costs, use safety, a compact structure, and stability and reliability.

From the above description, it can be seen that the above-mentioned embodiments of the present disclosure achieve the following technical effects:

It can be seen that in the rotary massage device based on positive and negative air pressure in this example, the driving device 300 drives the rotating shaft 200 to rotate and drives the outer wall of the swinging member 210 to swing reciprocally along the inner wall of the chamber, such that a volume of an air chamber formed between the swinging member 210 and the inner wall of the chamber increases or decreases when the swinging member 210 swings reciprocally, air at the suction opening 111 is sucked into the chamber or air in the chamber is compressed and exhaled to the suction opening 111, and the positive pressure and negative pressure alternating can be generated periodically at the suction opening 111, thereby achieving effects of alleviating fatigue and soreness by absorbing and relaxing skin muscles, and promoting blood circulation. With a relatively novel method of generating the positive pressure and negative pressure, the present disclosure has a simple structure, is safe and reliable in use, and achieves a good adsorption effect.

It should be understood that when an element is referred to as being "on" or "connected to" another element, it can be directly on the other element or directly connected to the other element or indirectly connected to the other element by an intervening element therebetween. On the contrary, when an element is referred to as being "directly on" or "directly connected to" another element, there are no intervening elements therebetween. Also, it should be noted that if directional indications (such as up, down, left, right, front, back, etc.) are involved in the embodiment of the present disclosure, the directional indications are only used to explain a relative position relationship, a movement condition and the like between various components under a certain posture (as shown in the accompanying drawings). If the specific posture changes, the directional indication changes accordingly.

The above are the preferred embodiments of the present disclosure. It should be noted that those skilled in the art can make several improvements and modifications without departing from the principles of the present disclosure, and these improvements and modifications may be regarded as the protection scope of the present disclosure.

What is claimed is:

1. A rotary massage device based on positive and negative air pressure, comprising:

a housing, wherein a first accommodating space is arranged in the housing, the first accommodating space is divided by a partition plate into at least two chambers, the partition plate is provided with an assembly opening, the housing is provided with a suction opening, and the suction opening is communicated with the at least two chambers;

a rotating shaft, wherein the rotating shaft is rotatably mounted at the assembly opening, at least two swinging members are arranged on the rotating shaft at an interval in a circumferential direction of the rotating shaft, at least two swinging members extend into the at least two chambers in one-to-one correspondence respectively, and at least two chambers are arranged around the central axis of the rotating shaft; and a driving device, wherein the driving device is arranged in the housing, and the driving device is drivingly-connected to one end of the rotating shaft, such that the driving device drives the rotating shaft to rotate and drives the at least two swinging members to swing reciprocally along inner walls of the at least two chambers, so as to generate positive pressure and negative pressure alternating periodically at the suction opening;

wherein inside each of the chambers is divided by the respective swinging into a compression chamber and a communication chamber, the compression chamber is communicated with the suction opening, the communication chamber is provided with a communication hole, and the communication chamber, though the communication hole, is communicated with an external environment; and a plurality of the compression chambers and a plurality of the communication are alternatively arranged and distributed in one-to-one correspondence in a circumferential direction.

2. The rotary massage device based on positive and negative air pressure according to claim 1, wherein the first accommodating space is generally cylindrical, an arc-shaped wall is formed on a side wall of each of the of least two chambers away from the rotating shaft, and the at least two swinging member swings reciprocally along the arc-shaped wall.

3. The rotary massage device based on positive and negative air pressure according to claim 1, wherein a concentrated chamber is arranged in an upper part of the first accommodating space, the concentrated chamber is communicated with the suction opening, at least two chambers are communicated with the concentrated chamber, and at least two chambers are communicated with the suction opening through the concentrated chamber.

4. The rotary massage device based on positive and negative air pressure according to claim 1, wherein a groove is formed at a bottom of the first accommodating space, the rotating shaft is rotatably mounted inside the groove through a bearing, an outer ring of the bearing is arranged inside the groove in an embedded manner, and an inner ring of the bearing is sleeved on the rotating shaft.

5. The rotary massage device based on positive and negative air pressure according to claim 1, wherein the at least two swinging members are vane-board structures that extends in a way of radially protruding from the rotating shaft, a first gap is formed between each of the at least two swinging members and each of the inner walls of the at least two chambers, and a width of the first gap is not greater than 1 mm; and a second gap is formed between the rotating shaft and the partition plate, and a width of the second gap is not greater than 1 mm.

6. The rotary massage device based on positive and negative air pressure according to claim 1, wherein the driving device comprises:

a driving part;

a cam, wherein a lower part of the cam is connected to an output shaft of the driving part such that the driving part drives the cam to rotate;

a sliding piece, wherein the sliding piece is slidably arranged inside the housing, and the sliding piece is movably connected to an upper part of the cam such that the sliding piece moves linearly and reciprocally when the cam rotates, and a movement direction of the sliding piece is arranged to be perpendicular to a rotational axis of the cam; and a connecting rod, wherein one end of the connecting rod is movably connected to the sliding piece, and the other end of the connecting rod is fixedly connected to the one end of the rotating shaft, such that through the connecting rod, linear reciprocating motion of the sliding piece is converted into reciprocating swinging motion of the swinging member on the rotating shaft, and a rotational axis of the rotating shaft is arranged to be perpendicular to the movement direction of the sliding piece.

* * * * *